(No Model.)
W. SMITH.
APPARATUS FOR BAKING.
No. 339,228. Patented Apr. 6, 1886.
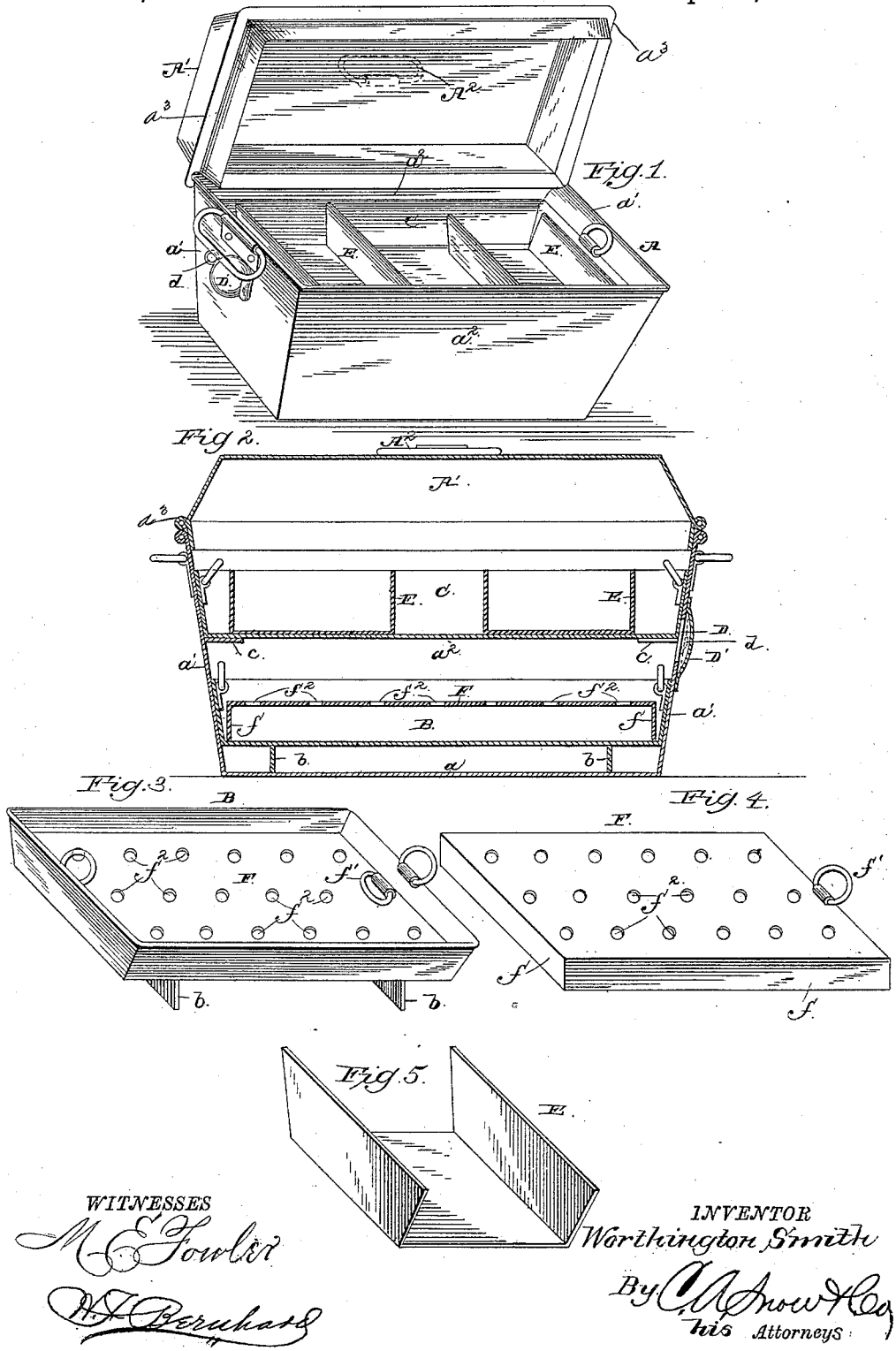
WITNESSES
INVENTOR
Worthington Smith
By Snow & Co.
his Attorneys

UNITED STATES PATENT OFFICE.

WORTHINGTON SMITH, OF TROY, OHIO, ASSIGNOR OF ONE-HALF TO JOHN M. JACKSON, OF SAME PLACE.

APPARATUS FOR BAKING.

SPECIFICATION forming part of Letters Patent No. 339,228, dated April 6, 1886.

Application filed August 10, 1885. Serial No. 174,007. (No model.)

*To all whom it may concern:*

Be it known that I, WORTHINGTON SMITH, a citizen of the United States, residing at Troy, in the county of Miami and State of Ohio, have invented a new and useful Improvement in Apparatus for Baking, &c., of which the following is a specification, reference being had to the accompanying drawings.

My invention relates to improvements in an apparatus for baking, roasting, or steaming for domestic purposes; and the novelty consists in the construction, combination, and arrangement of the various parts for service, substantially as hereinafter fully set forth, and particularly pointed out in the claims.

The object of my invention is to provide an apparatus for the purposes described, which shall be simple, strong, and durable in construction, efficient in operation, and cheap of manufacture.

In the drawings hereto annexed, Figure 1 is a perspective view of my invention with an upper removable tray for baking purposes. Fig. 2 is a longitudinal section thereof. Fig. 3 is a perspective view of the lower baking, roasting, or steaming pan or tray detached from the containing-vessel, and having a removable bread-tray in position therein. Fig. 4 is a perspective view of a removable perforated tray adapted to fit in the lower removable tray, and Fig. 5 is a like view of a bread-pan adapted to fit in one of the trays.

Like letters of reference indicate like parts in all the figures of the drawings, referring to which—

A designates the inclosing case or shell, preferably of sheet metal and rectangular in form, and comprising a bottom, $a$, and end and side walls, $a'$ $a^2$, and a removable cover, A', said side and end walls being flared outwardly from bottom toward the top, as shown. The cover A' may be hinged to one of the sides or ends of the vessel, or be removable therefrom, in which case it is provided with an outwardly-projecting flange, $a^3$, adapted to rest on the top of the upright walls of the vessel A, and having a handle, $A^2$.

B designates a tray, preferably rectangular in form, and of such dimensions as to fit in the vessel A, at the lower end thereof, said tray having flanges or cleats $b$ $b$, secured upon the bottom, and transversely across the same, to elevate the same above the plane of the bottom of the vessel A, so as to provide a hot-air space, which serves to prevent the intense heat arising from the bottom of the vessel A, which is placed in an oven of a range or stove, from scorching or burning the bread or other article being cooked.

C designates a tray or pan, also rectangular in form, and of such dimensions and size as to fit in the vessel A, at the upper end thereof, at a distance above the lower tray, B, to leave an intermediate hot-air space for the circulation of the hot air beneath the tray C, which is supported in said vessel A by ledges or flanges $c$ $c$, secured upon the end walls of the vessel at a proper distance below the upper edges thereof to provide the space between the lower tray, before referred to, and a space between the upper tray and the cover or top A', as is obvious.

When it is desired to bake a number of loaves of bread, cake, &c., the trays B and C are arranged in the vessel A, as before described, and a removable pan, E, is placed transversely across each of said pans or trays B C, at a point midway from its ends, said pans being left free or open at their ends, which are cut at an angle corresponding with the degree of inclination of the sides of the trays, the pans being of different sizes to fit the different-sized trays B C. When the pans E are in position, they divide each of the trays B C into two compartments or chambers—one at each end—and as they themselves accommodate a loaf, cake, or the like, the trays are capable of baking three loaves each.

When the vessel is to be used as a steamer, water is placed therein beneath the tray B, and the steam is generated and rises against the bottom of the tray B, and also against the tray C, when it is desired to use the same, thus providing for the steaming of a number of vegetables or other articles at the same time. The tray C is fitted tightly in the inclosing-vessel A, at or near the middle thereof, so as to form an oven in the upper part of the inclosing-vessel for the circulation of hot air therein, and the removable cover A' is also fitted tightly to the vessel to prevent the escape of the hot air from the oven or upper part of the vessel when the device is in use.

When the device is to be used for baking bread, the tray C is fitted tightly in the inclosing-vessel, above and out of contact with its bottom. The open-ended pans E, with the prepared dough, are fitted transversely across and within the tray, with their ends in contact with the inclosing walls of the oven, and the cover A' is then fitted tightly to the vessel, after which the apparatus is placed in a stove. After the bread has been properly baked the apparatus is removed from the stove and the pans E removed from the tray, the loaf of bread or the like being easily shoved out one of the open ends of the said pans E.

It is obvious that the tray C and pans E can be readily and quickly removed when it is desired to bake, roast, or steam a large article in the lower tray, B, and that the pan E can be quickly replaced in position in either of the trays, when the vessel A has been placed in the oven of a stove or range, to be heated while the bread or other article to be baked was being prepared and placed in the said pan E, which serves the purpose of an ordinary bread or cake pan.

D designates an opening or vent in one of the end walls of the shell A, and closed by a valve or flap, D', pivoted at one end to the shell, as at $d$, the function of which is to allow of the escape of the steam from the vessel A when the device is used as a steaming-vessel, and of the admittance of hot air from an oven to the said vessel.

F designates a removable shallow tray or partition having downwardly-bent flanges or feet $f$, which rest upon the bottom of the tray B, within which said partition rests above the plane of the bottom thereof, said tray having a handle, $f'$, at one or both ends, for its convenient manipulation, and a series of perforations, $f^2$, for the passage of the hot air to the article being roasted. This tray is adapted for use in connection with the tray B for the purposes of roasting and steaming meats, game, vegetables, and the like. By means of the perforations in the bottom thereof and the feet $f'$ the hot air is admitted to the under surface of the meat being roasted, which will effect the "browning" thereof without scorching or burning the same, while at the same time the gravy and fatty matter therefrom will flow down in the lower tray, B, and be preserved thereby.

The operation of my invention is as follows: When it is desired to use the device for baking purposes, the trays B C and the pans E are placed in position in the vessel A, with the articles to be baked in position therein, when the cover A' is placed thereon, and the vessel is put into the oven of a stove or range. The heat therein elevates the temperature of the vessel A and the trays and pans therein to the proper degree and accomplishes the baking operation. When the device is used as a steaming apparatus, water is poured into the chamber or vessel A beneath the tray B, and it and the trays C and E are employed, if desired.

When it is desired to roast a large piece of meat or a fowl, the tray C and pan E are omitted and the partition F used in lieu thereof, and the tray B placed in position in the vessel with the partition F, which is adapted to receive the article to be roasted, the valve D' being opened after the roasting has been finished, to allow of the escape of steam, &c.

Each of the trays B C is provided with handles $e$ $e$ at its ends for convenient operation.

The removable perforated tray may also be employed for steaming purposes, as is obvious.

In order to define the nature and scope of my invention, I would state that heretofore it has been proposed to provide a steaming-vessel with an upper removable tray having two or more transverse partitions rigidly secured to the tray, so as to provide tight compartments for the reception of tea, coffee, water, and the like, so as to keep the same hot; but in my apparatus I provide two or more open-ended removable pans, to be fitted in a pan or tray arranged in a vessel and transversely across the same, which are designed for baking bread and the like. When it is desired to bake a number of small cakes or loaves of bread, these removable pans are fitted in the tray and the dough put into the pans, and after baking has been completed in one or more of the pans they are removed, together with the bread or cake, without affecting the other pans.

I am also aware that it is not new to provide an interior vessel or tray with two or more ledges or feet to elevate the same above the bottom of the inclosing-casing; nor to suspend an imperforate pan above the perforated tray of a steamer.

In my improved device I provide an elevated pan and a removable perforated tray arranged within the pan and having depending feet, whereby the juice or fat exuding from articles or game, which are laid on the tray for roasting or steaming purposes, is caught by the elevated pan and prevented from waste, &c.

Having thus fully described my invention, what I claim as new, and desire to secure by Letters Patent, is—

1. The combination of a pan, C, and one or more open-ended trays fitting within the same and removable therefrom, substantially as described.

2. As an article of manufacture, a baking device comprising an inclosing-vessel, a pan or tray, C, located within and fitted tightly in the upper part of the same, one or more open-ended trays arranged transversely within the pan or tray C and removable therefrom, and the tightly-fitting cover, substantially as described.

In testimony that I claim the foregoing as my own I have hereto affixed my signature in presence of two witnesses.

WORTHINGTON SMITH.

Witnesses:
GEORGE S. LONG,
GEO. M. KNOX.